US006636724B1

United States Patent
Pillekamp et al.

(10) Patent No.: US 6,636,724 B1
(45) Date of Patent: Oct. 21, 2003

(54) METHOD FOR INDOOR OPERATION OF A WIRELESS TELECOMMUNICATION DEVICE

(75) Inventors: Klaus-Dieter Pillekamp, Erkrath (DE); Markus Reinhardt, Oberelchingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/700,406

(22) PCT Filed: May 11, 1999

(86) PCT No.: PCT/DE99/01427

§ 371 (c)(1),
(2), (4) Date: Nov. 13, 2000

(87) PCT Pub. No.: WO99/59262

PCT Pub. Date: Nov. 18, 1999

(30) Foreign Application Priority Data

May 13, 1998 (DE) .......................................... 198 21 519

(51) Int. Cl.$^7$ .................... H04B 1/00; H04B 15/00
(52) U.S. Cl. ............................... 455/69; 455/522
(58) Field of Search ................... 455/69, 522, 456, 455/63, 67.1

(56) References Cited

U.S. PATENT DOCUMENTS

| 5,535,238 A | 7/1996 | Schilling et al. |
| 5,566,165 A | 10/1996 | Sawahashi et al. |
| 5,604,766 A | 2/1997 | Dohi et al. |
| 5,631,921 A | 5/1997 | Schilling |
| 5,794,129 A | 8/1998 | Komatsu |
| 6,496,700 B1 * | 12/2002 | Chawla et al. ........... 455/435.2 |

FOREIGN PATENT DOCUMENTS

| DE | 44 26 255 | 2/1996 |
| EP | 0 330 166 | 8/1989 |
| EP | 0 682 417 | 11/1995 |
| EP | 0 682 4181 | 11/1995 |
| JP | 9-36801 | 7/1997 |
| WO | WO 96/02097 | 1/1996 |
| WO | WO 97/26716 | 7/1997 |

* cited by examiner

Primary Examiner—Vivian Chin
Assistant Examiner—Yuwen Pan
(74) Attorney, Agent, or Firm—Bell Boyd & Lloyd LLC

(57) ABSTRACT

In a method for indoor operation of a wireless telecommunication device that comprises at least one base station and at least one mobile part, the momentary reception power is measured in the receiver of the mobile part and the reception power value is communicated to the base station for the control of the transmission power. The ratio of reception power to noise power is determined at predetermined time intervals in the receiver of the mobile part. The respectively obtained ratio value is compared to a rated value and, dependent on the result, one signalling bit per data frame is transmitted from the mobile part to the base station. A calculation of the current or updated transmission power with adaptive incrementation control is then undertaken in the base station. The calculation of a current transmission power value thereby occurs on the basis of the previous transmission power value plus a product of a correction value determining the incrementation and a default value determined from the signalling bit.

7 Claims, 2 Drawing Sheets

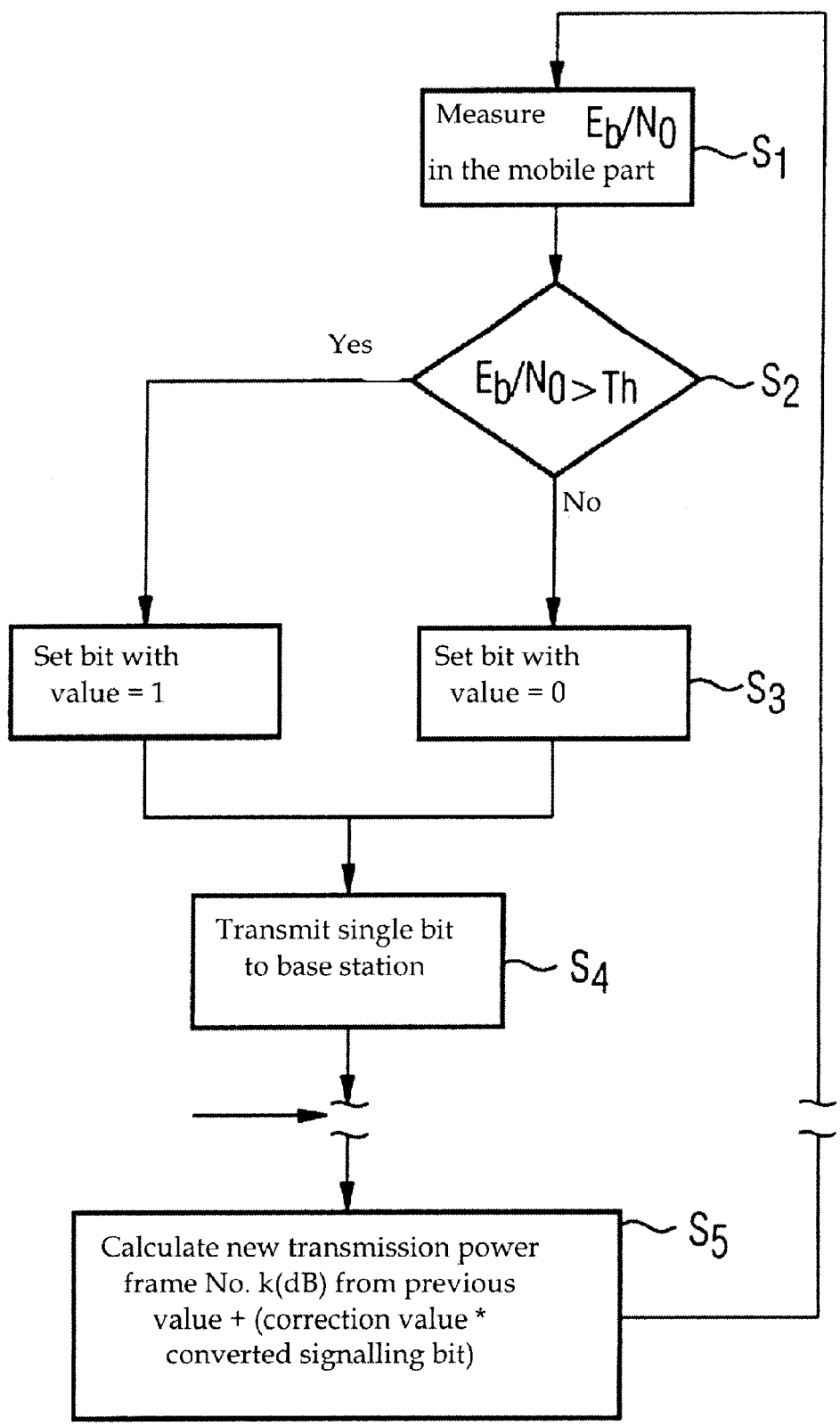

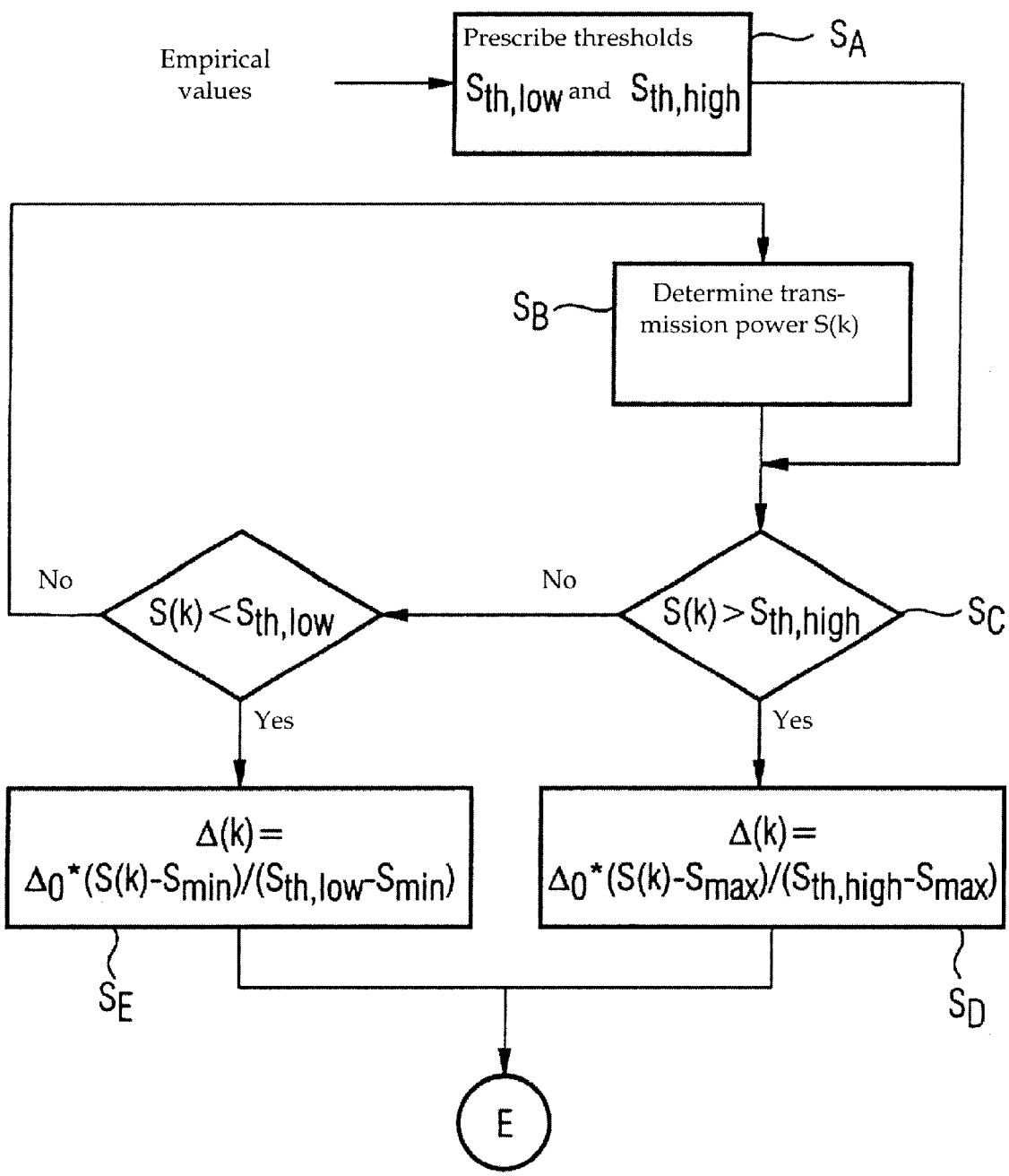

METHOD FOR INDOOR OPERATION OF A WIRELESS TELECOMMUNICATION DEVICE

BACKGROUND OF THE INVENTION

The invention is directed to a method for indoor operation of a wireless telecommunication device that comprises at least one base station and at least one mobile part, whereby the momentary reception power is measured in the receiver of the mobile part and the reception power value is communicated to the base station for control of the transmission power.

Wireless telecommunication devices, i.e. mobile radio transmission/reception devices that are utilized as terminal devices, are well known. Let, for example, cordless, mobile, satellite, trunk radio telephones and the like be cited here.

In Europe, fixing on the DECT standard (Digital European Cordless Telecommunication Standard) occurs via the European Telecommunication Standard Institute. DECT systems are based on the wireless information exchange between base and mobile stations or mobile parts, whereby the range within a radio cell amounts to up to a few hundred meters. The DECT frequency ranges lie between 1880 and 1900 MHz. The DECT standard can be employed both given individual cell arrangements, for example wireless home telephones in the indoor area, as well as in multiple radio cell arrangements, for example a corporate network.

The standardized radio protocols are designed such that an operation of a plurality of base and mobile stations is possible in the same physical environment since a division of the frequency spectrum into a predetermined plurality of physical channels is undertaken. For example, the DECT standard provides a fixed allocation between physical DECT channels and logical channel numbers. The protocols defined in the standard for the information and message exchange enable the implementation of transmission and communication procedures even when different subscribers are active in a local network of a DECT system.

The message transmission is possible on the basis of various transmission methods, for example FDMA (frequency division multiple access), TDMA (time division multiple access) and/or CDMA (code division multiple access) within the radio standards DECT, GSM or others.

The power or, respectively, energy consumption of the wireless telecommunication device is determined by the type of communication that is specific by different ranges in the transmission of radio messages.

Due to slight transmission range and the relatively slight transmission power given cordless telephones according to the DECT standard, the energy consumption is lower than given comparably operated cellular mobile radiotelephones according to the GSM standard, whereby the latter have transmission powers up to 2000 mW.

EP 0 330 166 B1 discloses that power surpluses in radio systems be avoided by a control of transmission power dependent on the transmission quality as well as on the reception field strength.

As disclosed therein, a combination of a reception level evaluation and a quality evaluation in a base station of the mobile radiotelephone system via the phase jitter determined from the signal incoming in the base station is employed as a control criterion for the control of the transmission power of a mobile handset of a mobile radiotelephone system.

Given the mobile radio transmission/radio reception unit, particularly the mobile part of a cordless telecommunication system according to DE 44 26 255 A1, the mobile part—independently of a reception level evaluation with the base station—should itself be in the position to control the transmission power in order to reduce the power or, energy consumption, so that maximum possible operating duration results in the standby or active mode. It is proposed therefor to design the mobile part such that it is placed in the position of analyzing acquired special information, for example field strength values and/or transmission error values, in order to correspondingly adapt the transmission power with a servo control circuit on the basis thereof. In order to be able to implement the described control of the transmission power, the cordless mobile part disclosed therein is modified such that a control circuit is allocated to a micro-controller, the control circuit being formed of individual program modules implemented in the micro-controller.

The field strength values and transmission error values available in the micro-controller are interpreted and used with the control circuit for regulating the transmission power of the mobile part. The control circuit therein is designed such that the value of the manipulated quantity, i.e. the transmission power to be regulated, follows the changing values of the reference variable, namely the field strength values and the transmission error values. The distance from the base station can be derived from the acquired field strength values, whereas a criterion for the quality of the received radio messages derives from the transmission error values. Following a corresponding interpretation in the micro-controller, the raising or lowering of the transmission power in the radio part is initiated via corresponding ports or registers, for example in a burst mode controller. The known regulation can thereby work both continuously as well as in a few large steps, i.e. discontinuously.

The known transmission power controls at the side of the mobile part for lengthening the operating times or for reducing the energy consumption are activated when the corresponding mobile parts are synchronized with a base station via predetermined protocol frames. However, it is disadvantageous that a plurality of values must be exchanged between the mobile part and the base station or vice versa for the implementation of the control itself, this increasing the channel load and reducing the data rate that is to be otherwise transmitted.

The time variance of the channel or of the channels is extremely slight in the transmission power control in mobile radiotelephone systems and indoor transmission, since it is to be assumed that the respective mobile only moves very slowly, i.e. at a speed of $\leq 3$ km/h. The time dispersion of the respective channel is likewise slight. In other words, the channel under consideration is hardly frequency-selective but time-selective. A suitable, resulting channel model taking the aforementioned circumstances into consideration is that of flat fading (Rayleigh fading channel). Given such a channel model, relatively brief-duration fluctuations in reception signal power result that can exhibit a dynamics of up to a few 10 dB.

Due to the highly fluctuating reception signal power, extremely high values of the ratio of reception signal power to noise power are to be documented in order to achieve a satisfactory bit error rate of the actual data transmission. The variation of the reception signal power in the scenario under consideration can be reduced by the above-described transmission power regulation, whereby it is necessary therefor that the reception signal power be measured at the receiver and these measured values be transmitted to the transmitter on the basis of a suitable signalling, so that the transmission power of the base part can be regulated, as disclosed in the Prior Art. However, the transmission of the measured values from the mobile part to the base station is problematic due to the fast and frequent change of the measured values under certain circumstances.

EP 0 682 417 A2 discloses a method wherein a current signal/interference power ratio is determined in a mobile part and is compared to a predetermined value of this ratio, so that a transmission power control bit is generated dependent on the result of this comparison and is communicated to a base station, whereby the base station determines and sets a new, current transmission power value on the basis of the plurality of successive transmission power control bits with the same value.

SUMMARY OF THE INVENTION

It is therefore an object of the invention to specify a method for indoor operation of a wireless telecommunication device that comprises at least one base station and at least one mobile part, and whereby the base station—with minimized signalling expense—is placed in the position of realizing an effective regulation of the transmission power for improving the transmission conditions.

In addition to providing a low signalling expense, it is also an object of the invention to simultaneously provide a possibility with the assistance of which a limitation of the dynamics of the transmission power control can be undertaken in a simple way.

According to the method of the present invention for operation of a wireless telecommunication device that comprises at least one base station and at least one mobile part, momentary reception power is measured in a receiver of the mobile part and the reception power value is communicated to the base station for control of transmission power. A ratio of reception power to noise power ($E_0/N_0$) is determined at predetermined time intervals in the receiver of the mobile part. The respectively obtained ratio value is compared to a rated value and, dependent on a result, one signaling bit ($e(k)$) per data frame ($k$) is transmitted from the mobile part to the base station. A calculation of the current transmission power ($S(k)$) with adaptive incrementation control on the basis of a previous transmission power value ($S(k-1)$) plus a product of a correction value ($\Delta(k)$) determining the incrementation and a default value ($\bar{e}(k)$) determined from the signaling bit ($e(k)$) occurs in the base station according to the following relationship:

$$S(k)=S(k-1)+\Delta(k)\cdot\bar{e}(k) \quad k=1,2,3,\ldots$$

with $$\bar{e}(k)=2\cdot e(k)-1$$

and $$\Delta(k)=\Delta(k-1)K^{[\bar{e}(k)\cdot\bar{e}(k-1)]}]$$

where $S(k)$=transmission power for frame No. k (in dB)

$\Delta(k)$=correction value for the transmission power for frame No. k $K$=correction constant for the adaptive incrementation correction $e(k)$=signalling bit from the receiver for frame No. k, $e(k)\in\{0,1\}$ $\bar{e}(k)$=converted signalling bit from the receiver for frame No. k, $e(k)\in\{-1,1\}$ apply.

A basic idea of the invention, accordingly, is comprised in transmitting only a single bit for presenting the reception conditions of the mobile part to the base part or, respectively, base station per transmitted data frame within standardized protocols, whereby the base station, with the assistance of a specific form of calculation, is in the position to implement the regulation of the transmission power based solely on this information.

According to the invention, recourse is had to an adaptive incrementation control for the calculation for the adaptation of the transmission power and a dynamics limitation is additionally introduced.

According to the inventive method, the ratio of reception power to noise power is first determined at predetermined time intervals in the receiver of the mobile part, preferably realized by software modules of a micro-controller provided thereat. The determination of this ratio can ensue quasi continuously or discontinuously.

The relationship value that is respectively obtained is then compared to a predetermined rated value, and, dependent on the result of the comparison, one signalling bit per data frame is transmitted from the mobile part to the base station. In the base station, this signalling bit, which can be an unoccupied bit of a standard protocol, then serves for calculating the current or, respectively, updated transmission power, whereby the incrementation can be adaptively defined.

The current transmission power value is determined on the basis of a preceding transmission power value in that a product of a correction value that determines the incrementation and a default value determined from the signalling bit is added to the previous transmission power value.

When the ratio of reception power to noise power identified in the receiver of the mobile part lies under a rated value, the signalling bit is defined as 0. When the ratio between reception and noise power was found to lie above the rated value, then the signalling bit has the value 1.

Inventively, there is the additional possibility of varying the incrementation-defining correction value for limiting the dynamics of the transmission power control dependent on whether an upper or lower transmission power threshold is reached, as a result whereof power discontinuities and control problems can be prevented, so that the control and transient behavior can be optimized overall.

Given recourse to a micro-controller and suitable program modules, the base station inventively determines the transmission power $S(k)$ according to the following relationship:

$$S(k)=S(k-1)+\Delta(k)\cdot\bar{e}(k) \quad k=1,2,3,\ldots$$

with $$\bar{e}(k)=2\cdot e(k)-1$$

and $$\Delta(k)=\Delta(k-1)K^{[\bar{e}(k)\cdot\bar{e}(k-1)]}$$

where $S(k)$ transmission power for frame No. k (in dB)

$\Delta(k)$ correction value for the transmission power for frame No. k (incrementation)

$K$ correction constant for the adaptive incrementation correction $e(k)$ signalling bit from the receiver for frame No. k, $e(k)\in\{0,1\}$ $\bar{e}(k)$ converted signalling bit from the receiver for frame No. k, $e(k)\in\{-1,1\}$.

The start values and initial parameters for the above calculating rule are:

$S(0)=S_0=1$ (normed)

$\Delta(0)=\Delta_0$ $e(0)=1$ $K-K_0>1$

In addition to the regulation of the transmission power with a signalling expense of only a single bit, there is the possibility of undertaking a dynamics limitation. For this, the correction value $\Delta(k)$ that defines the incrementation is varied in the following way in the proximity of the upper limit and/or the lower limit of the transmission power:

If $S(k)>S_{th,\ high}$, then set $\Delta(k)=\Delta_0\cdot(S(k)-S_{max})/(S_{th,high}-S_{max})$ If $S(k)<th_{th,\ low}$, then set $\Delta(k)=\Delta_0\cdot(S(k)-S_{min})/(S_{th,low}-S_{min})$.

The thresholds $S_{th,low}$ and $S_{th,high}$ from which a variation of the values for the incrementation $\Delta(k)$ occurs and the start values $\Delta_0$ for the incrementation are predetermined transferred or updated from earlier communication modes in the sense of empirical values.

The invention shall be explained in greater detail below on the basis of an exemplary embodiment as well as with the assistance of drawing figures.

BRIEF DESCRIPTION OF THE DRAWINGS

FIG. 1 is program flowchart with schematic illustration of the method for regulating transmission power including a calculating rule for the base station; and FIG. 2 is a program flowchart for the variation of the correction values $\Delta(k)$ defining the incrementation for dynamics limitations of the regulation of the transmission power.

DESCRIPTION OF THE PREFERRED EMBODIMENTS

In the method for, in particular, indoor operation of a wireless telecommunication device that comprises at least one base station and at least one mobile part, the mobile part—with reference to FIG. 1—first determines the ratio of reception power $E_b$ to noise power $N_0$ in step S1. According to step S2, the ratio is compared to a predetermined rated value. When the ratio lies above the rated value, a signalling bit is set equal to 1. When the specific ratio lies under the rated value, a signalling bit having the value 0 is set. Since a corresponding bit was set in step S3, this single bit per frame to be transmitted is transmitted to the base station via a standardized air interface according to step S4.

The base station then determines a new transmission power according to step 5 for the frame No. k in dB from the previous value plus a product of the correction value or the incrementation and the converted signalling bit.

Step S5, i.e. the calculation of the new transmission power, occurs with recourse to the following relationships:

$S(k)=S(k-1)+\Delta(k)\cdot\bar{e}(k)$ $k=1,2,3,\ldots$ with $\bar{e}(k)=2\cdot e(k)-1$ and $\Delta(k)=\Delta(k-1)K^{[\bar{e}(k)\cdot\bar{e}(k-1)]}$ whereby $S(k)$ transmission power for frame No. k (in dB)

$\Delta(k)$ correction value for the transmission power for frame No. k (incrementation)

K correction constant for the adaptive incrementation correction $e(k)$ signalling bit from the receiver for frame No. k, $e(k)\in\{0,1\}$ $\bar{e}(k)$ converted signalling bit from the receiver for frame No. k, $\bar{e}(k)\in\{-1,1\}$ apply.

The start values and initial parameters for the above calculating rule are thereby:

$S(0)=S_0=1$ (normed)

$\Delta(0)=\Delta_0$ $e(0)=1$ $K=K_0>1$

The method for limiting the dynamics of the regulation of the transmission power in the proximity of an upper limit $S_{max}$ or, respectively, lower limit $S_{min}$ of the transmission power $S(k)$, i.e. the correction or variation of the value of $\Delta(k)$, shall be described with reference to FIG. 2.

In a step $S_A$, thresholds $S_{th,\ low}$ and $S_{th,\ high}$ from which a correction of the values for the incrementation should ensue are first prescribed. These values are located within the range of the transmission power $S(K)$ covered from the upper limit $S_{max}$ and, respectively, the lower limit $S_{min}$.

The thresholds $S_{th,\ low}$ and $S_{th,\ high}$ can also be acquired and offered as empirical values from earlier measurements. After the determination of the current or momentary transmission power $S(k)$ in step $S_B$, a check is then carried out in step $S_C$ to see whether the momentary transmission power exceeds the upper threshold $5_{th,\ high}$ or is lower than the lower threshold $S_{th,\ low}$.

When the current transmission power $S(k)$ is higher than the threshold $S_{th,high}$, a correction of the incrementation $\Delta(k)$ occurs according to the following relationship (step $S_D$):

$\Delta(k)=\Delta_0\cdot(S(k)-S_{max})/(S_{th,high}-S_{max})$.

Given a transmission power value $S(k)$ lower than the threshold $S_{th,\ low}$, $S(k)$ is defined as follows (step $S_E$):

$\Delta(k)=\Delta_0\cdot(S(k)-S_{min})/(S_{th,low}-S_{min})$.

With the above-described exemplary embodiment, one succeeds in a simple way in specifying an adaptive incrementation control for the adaptation of the transmission power of a base station in a telecommunication system, whereby only one bit of signalling expense proceeding from the mobile part is required for the transmission of the information representing the reception conditions. At the same time, a variation of the incrementation of the control or a dynamics limitation can be realized in the base station.

Although various minor changes and modifications might be proposed by those skilled in the art, it will be understood that our wish is to include within the claims of the patent warranted hereon all such changes and modifications as reasonably come within our contribution to the art.

We claim:

1. A method for operation of a wireless telecommunication device that comprises at least one base station and at least one mobile part, comprising the steps of:

measuring momentary reception power in a receiver of the mobile part and communicating a value of the reception power to the base station for control of transmission power;

determining a ratio of reception power to noise power $(E_b/N_0)$ at predetermined time intervals in the receiver of the mobile part;

comparing the respectively obtained ratio value to a rated value and, dependent on a result, transmitting one signalling bit (e(k)) per data frame (k) from the mobile part to the base station; and providing a calculation of the current transmission power (S(k)) with adaptive incrementation control on the basis of a previous transmission power value (S(k−1)) plus a product of a correction value (Δ(k)) determining the incrementation and a default value ($\bar{e}$(k)) determined from the signalling bit (e(k)) in the base station according to the following relationship:

$$S(k)=S(k-1)+\Delta(k)\cdot\bar{e}(k) \quad k=1,2,3,\ldots$$

with $$\bar{e}(k)=2\cdot e(k)-1$$

and $$\Delta(k)=\Delta(k-1)K^{[\bar{e}(k)\cdot\bar{e}(k-1)]}$$

where

S(k)=transmission power for frame No. k (in dB)
Δ(k)=correction value for the transmission power for frame No. k (incrementation)
K=correction constant for the adaptive incrementation correction
e(k)=signalling bit from the receiver for frame No. k, e(k)∈{0,1}
$\bar{e}$(k)=converted signalling bit from the receiver for frame No. k, e(k)∈{−1,1} apply.

2. The method according to claim 1, wherein the signalling bit (e(k)) is 0 when the ratio of reception power to noise power ($E_b/N_0$) lies below the rated value and corresponds to the value 1 when the ratio of reception power to noise power ($E_b/N_0$) lies above the rated value.

3. The method according to claim 1 wherein for limiting dynamics of the transmission power, the incrementation-defining correction value (Δ(k)) is varied dependent on reaching an upper or lower transmission power threshold ($S_{th,\,low}$; $S_{th,\,high}$).

4. The method according to claim 1 wherein the following are initial or start parameters:

S(0)=$S_0$=1 (normed)
Δ(0)=$\Delta_0$
e(0)=1
K=$K_0$>1.

5. The method according to claim 1 wherein for limiting dynamics of the transmission power control in the proximity of at least one of an upper limit and lower limit ($S_{max}$; $S_{min}$) of the transmission power (S(k), the incrementation-defining correction value (Δ(k)) is varied as follows:

given $S(k)>S_{th,\,high}$, $$\Delta(k)=\Delta_0\cdot(S(k)-S_{max})/(S_{th,high}-S_{max})$$

given $S(k)<S_{th,\,low}$, $$\Delta(k)=\Delta_0\cdot(S(k)-S_{min})/(S_{th,low}-S_{min}),$$

whereby the upper and the lower transmission power threshold ($S_{th,\,high}$) and ($S_{th,\,low}$) as well as the start value $\Delta_0$ for the incrementation are prescribed or acquired from empirical values when operating the wireless telecommunication device and are updated in the sense of empirical values.

6. The method of claim 1 wherein the operation comprises indoor operation.

7. A method for operation of a wireless telecommunication device that comprises at least one base station and at least one mobile part, comprising the steps of:

measuring momentary reception power in a receiver of the mobile part and communicating a value of the reception power to the base station for control of transmission power;

determining a ratio of reception power to noise power at time intervals in the receiver of the mobile part;

comparing the respectively obtained ratio value to a rated value and, dependent on a result, transmitting one signalling bit (e(k)) per data frame (k) from the mobile part to the base station; and providing a calculation of the current transmission power (S(k)) with adaptive incrementation control on the basis of a previous transmission power value (S(k−1)) plus a product of a correction value (Δ(k)) determining the incrementation and a default value ($\bar{e}$(k)) determined from the signalling bit (e(k)) in the base station according to the following relationship:

$$S(k)=S(k-1)+\Delta(k)\cdot\bar{e}(k) \quad k=1,2,3,\ldots$$

with $$\bar{e}(k)=2\cdot e(k)-1$$

and $$\Delta(k)=\Delta(k-1)K^{[\bar{e}(k)\cdot\bar{e}(k-1)]}$$

where

S(k)=transmission power for frame No. k (in dB)
Δ(k)=correction value for the transmission power for frame No. k
K=correction constant for the adaptive incrementation correction
e(k)=signalling bit from the receiver for frame No. k, e(k)∈{0,1}
$\bar{e}$(k)=converted signalling bit from the receiver for frame No. k, e(k)∈{−1,1} apply.

* * * * *